Patented May 7, 1946

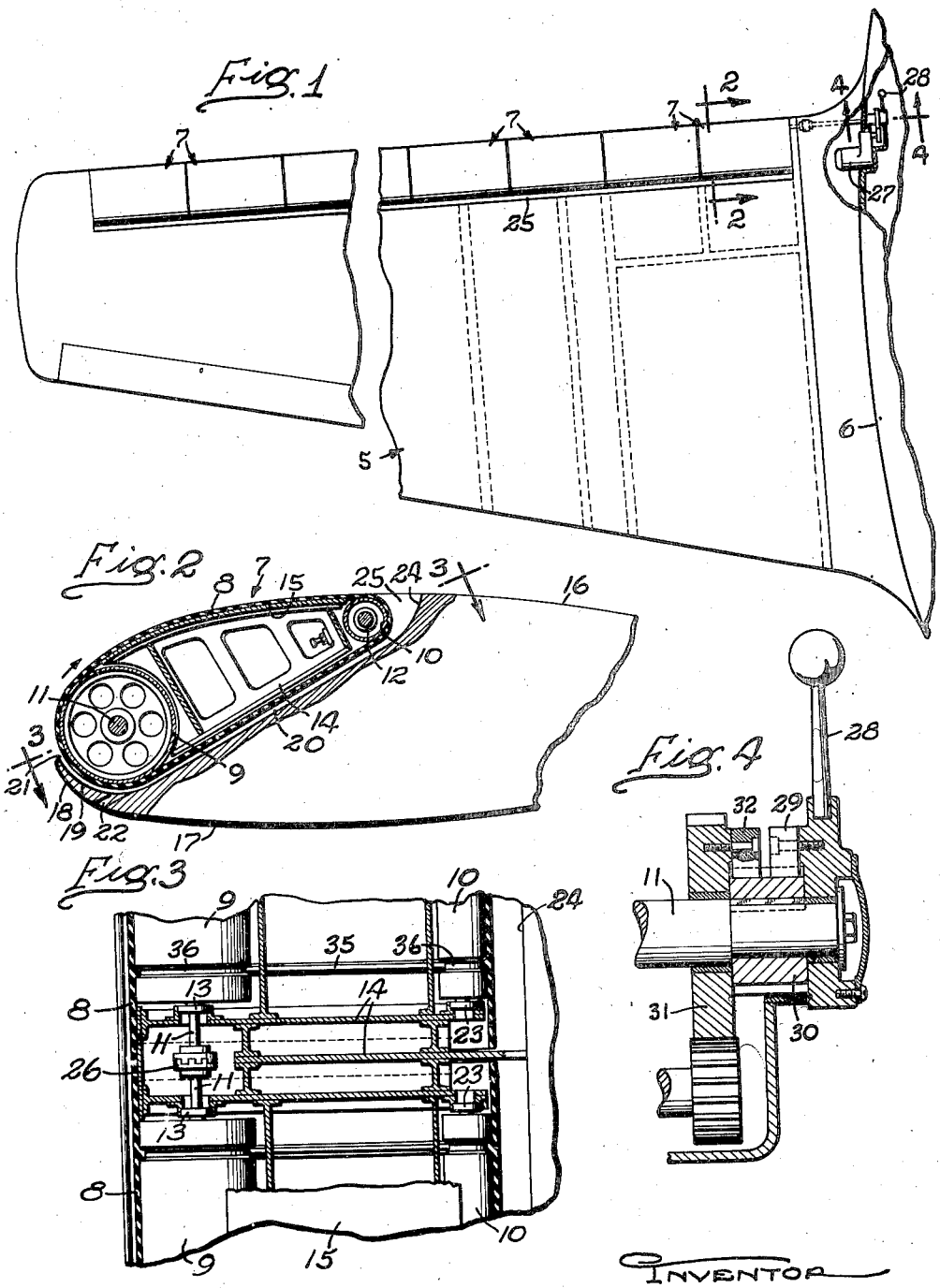

2,399,648

UNITED STATES PATENT OFFICE 2,399,648

DEICING MECHANISM

Harold Norris Love, Chicago, Ill.

Application January 28, 1944, Serial No. 520,021

5 Claims. (Cl. 244—134)

This invention relates to mechanism operable mechanically to break up and effect the removal of ice forming on the wings of an airplane.

The general object is to provide a mechanism of the above character which is simple and inexpensive in construction, which may be actuated manually or by power, intermittently or continuously, which may be controlled from a remote point, and which may be adapted readily to wings of various lengths.

Another object is to incorporate in an airplane wing structure an endless flexible element which defines the wing surface of the area on which ice tends to form, and which is movable to effect breakage of the ice layer.

A further object is to provide an endless movable wing surface adapted to travel parallel to the motion of the airplane in flight and to utilize the flow of air relative to the wing as a source of power for removing broken ice.

The invention also resides in the novel mounting of the belt and the manner of actuating the same.

Other objects and advantages of the invention will become apparent from the following detailed description taken in connection with the accompanying drawing, in which Figure 1 is a fragmentary plan view of an airplane wing equipped with mechanism embodying the novel features of the present invention.

Fig. 2 is a section taken substantially along the line 2—2 of Fig. 1.

Fig. 3 is a fragmentary section taken along the line 3—3 of Fig. 2.

Fig. 4 is a fragmentary section taken along the line 4—4 of Fig. 1.

While the invention is susceptible of various modifications and alternative constructions, I have shown in the drawing and will herein describe in detail the preferred embodiment. It is to be understood, however, that I do not intend to limit the invention by such disclosure but aim to cover all modifications and alternative constructions falling within the spirit and scope of the invention as expressed in the appended claims.

Referring to the drawing, 5 indicates one wing of an airplane projecting laterally from a fuselage 6. The wing is of airfoil section and is equipped along its forward edge with a plurality of deicing elements 7 arranged side by side and defining substantially the entire forward end surface of the airplane wing as well as the adjacent horizontal surface, in this instance the top surface.

Each element comprises an endless flexible belt 8 composed of fabric, rubber coated fabric, or the like and extending around rollers 9 and 10 which preferably are of different sizes. The rollers are carried by shafts 11 and 12 rotatably mounted within the wing to turn on axes paralleling the forward edge of the wing. The shaft 11 of the larger roller projects beyond the ends of the latter and is journaled in bearings 13 supported in the framework 14 of the wing. This roller is positioned so that the arcuate portion of the belt extending around the forwardly facing part of the roller defines the extreme front edge surface of the wing, the roller being dimensioned to impart the desired convex curvature to this surface. One rearwardly extending side of the belt loop, in this instance the top side, defines the forward portion of the top wing surface and is supported and firmly backed by a plate 15 of the frame structure 14. The plate is curved to impart the desired contour to that portion of the wing surface defined by the belt and to locate the top side of the belt substantially flush with the remaining rearward portion 16 of the wing surface. Preferably, the wing is constructed with its under surface 17 curving upwardly as indicated at 18 around the lower part of the roller 9 whose surface is spaced from the opposite surface 19 of the frame structure so as to provide a relatively narrow channel 20 which is open at its forward end 21 and which may be provided with an auxiliary opening 22.

The smaller roller 10 is disposed wholly within the wing with its upper side substantially tangent to the wing surface 16. For this purpose, the ends of its shaft 12 are journaled in bearings 23 on the framework 14 spaced from the bearings 13 so as to hold the belt taut, suitable means (not shown) being provided to adjust the tightness of the belt. The rear end of the belt is spaced from the opposed frame surface 24 so as to form an upwardly flaring recess 25 from which ice breaking off from the top of the belt as the latter bends around the roller 10 will be removed effectively by air flowing upwardly and rearwardly along the channel 20. The margins of the belts 8 are disposed as close together as practicable, and the shafts 11 of their supporting front rollers are connected by drive couplings 26. The shaft 11 of the roller 9 nearest the fuselage projects through the side wall of the latter and is adapted to be rotated either by hand or by an electric motor 27 or other source of rotary power. Herein, hand actuation is effected by oscillating a hand lever 28 back and forth during which a pawl 29 engaging a ratchet wheel 30 advances the shaft 11 and the connected rollers 9 step by step in a direction to move the upper belt surfaces upwardly around the rollers 9 and then rearwardly along the plates 15. The motor 27 operates through speed reduction gearing to turn a gear 31 which carries a pawl 32 also meshing with the ratchet 30. During operation of the motor, the belts will be run continuously.

During operation of the airplane, the layer or film of ice tending to form on the forward edge of the wing opposite the roller 9 will be broken as a result of the change in the contour of the belt in passing from the roller 9 to the plate 15 and similarly in passing from the plate 15 to the smaller roller 10. The ice pieces thus broken off from the belt will be blown off from the wing, and accumulation of pieces of ice in the throat 25 will be avoided by the stream of air flowing upwardly and out of the recess along the passage 20. Ordinarily, the deicing elements will be actuated more or less constantly during operation of the airplane at temperatures below freezing. It will be noted that the substantial air pressures exerted on the wing structure will be applied to the belt in a direction to assist in the movement of the belt rearwardly in the intended manner.

If desired, the belts 8 may be formed at intervals with V-shaped ribs 35 which ride in grooves 36 formed in the rollers 9 and 10. Such arrangement increases the friction between the driving roller and the belts.

I claim as my invention:

1. In an airplane wing structure, an endless belt mounted within said structure with one part of the belt defining parts of the leading edge and the adjacent top surface of the wing, means for moving said belt relative to said wing structure in the direction of air flow along said top surface, means for bending said belt as it passes beneath said top surface whereby to brush off ice formed thereon, and means for causing an upward discharge of the broken off ice.

2. In an airplane wing structure, an endless belt mounted within said structure with one part of the belt defining parts of the leading edge and the adjacent top surface of the wing, means for moving said belt relative to said wing structure in the direction of air flow along said top surface, means for bending said belt as it passes beneath said top surface whereby to break off ice formed thereon, the bent portion of said belt and the opposed portion of said wing structure forming an upwardly opening recess terminating at said top wing surface, and means for directing a current of air upwardly through said recess to discharge any broken off ice accumulating therein.

3. In an airplane wing structure, an endless belt mounted within said structure with one part of the belt defining parts of the leading edge and the adjacent top surface of the wing, means for moving said belt relative to said wing structure in the direction of air flow along said top surface, means for bending said belt as its passes beneath said top surface whereby to break off ice formed thereon, the bent portion of said belt and the opposed portion of said wing structure forming an upwardly opening recess terminating at said top wing surface, and means defining an air channel extending rearwardly within the wing structure and terminating at said recess and opening forwardly from the wing structure whereby the forward motion of the wing structure induces a flow of air rearwardly and upwardly through said recess.

4. In combination with an airplane wing having a supporting framework, a pair of rollers mounted on said framework within said wing to turn on axes parallel to the leading edge of the wing and disposed with their peripheries substantially tangent to the top wing surface, one of said rollers being disposed near said leading wing edge and sized to correspond to the contour of such edge, an endless belt supported on said rollers and forming parts of the leading edge and adjacent top surface of the wing, manually controllable means for moving said belt to advance its exposed surface away from said wing edge, and means providing an air channel extending along the underside of said belt and having an inlet disposed adjacent said wing edge and an outlet at the junction of said belt and said top wing surface.

5. In an airplane wing structure, an endless belt mounted within said structure with one part of the belt defining parts of the leading edge and the adjacent top surface of the wing, means for moving said belt relative to said wing structure in the direction of air flow along said top surface, means for bending said belt as it passes beneath said top surface whereby to brush off ice formed thereon, and continuously-acting means exerting an upwardly-directed force on the broken-off pieces of ice for diverting the same backwardly along the remaining top surface of the wing.

HAROLD NORRIS LOVE.